United States Patent [19]
Slade et al.

[11] Patent Number: 5,861,684
[45] Date of Patent: Jan. 19, 1999

[54] FLEXIBLE IMPLEMENTATION OF DISTRIBUTED DC POWER

[75] Inventors: Boyd E. Slade, Austin; David L. Aldridge, Dripping Springs; William J. Watson, Austin; William P. Bunton, Pflugerville, all of Tex.

[73] Assignee: Tandem Computers Incorporated, Cupertino, Calif.

[21] Appl. No.: 579,376

[22] Filed: Dec. 27, 1995

[51] Int. Cl.⁶ .................................................. H02J 7/00
[52] U.S. Cl. ........................ 307/66; 307/150; 307/19; 307/23; 307/44
[58] Field of Search .................................. 307/43, 44, 64, 307/65, 66, 147, 150, 11, 18, 19, 23, 80

[56] References Cited

U.S. PATENT DOCUMENTS

| | | |
|---|---|---|
| 4,614,877 | 9/1986 | Knesewitsch et al. ................ 307/64 |
| 4,996,628 | 2/1991 | Harvey et al. ........................ 307/150 |
| 5,214,311 | 5/1993 | Kageyama et al. .................... 307/18 |
| 5,266,838 | 11/1993 | Gerner .................................... 307/19 |
| 5,289,364 | 2/1994 | Sakurai ................................. 363/147 |
| 5,477,091 | 12/1995 | Fiorina et al. ........................ 307/66 |

*Primary Examiner*—William M. Shoop, Jr.
*Assistant Examiner*—Jonathan S. Kaplan
*Attorney, Agent, or Firm*—Townsend and Townsend and Crew

[57] ABSTRACT

A DC power distribution system can be configured to utilize a variable number of AC power distribution units. Installation of a converter unit in place of a PDU and resetting of associated switches permits inexpensive and rapid reconfiguration of the system without interrupting power supply to current receiving units. Techniques such as mechanical keying and sense switches minimize the possibility of human error in the reconfiguring operation.

13 Claims, 5 Drawing Sheets

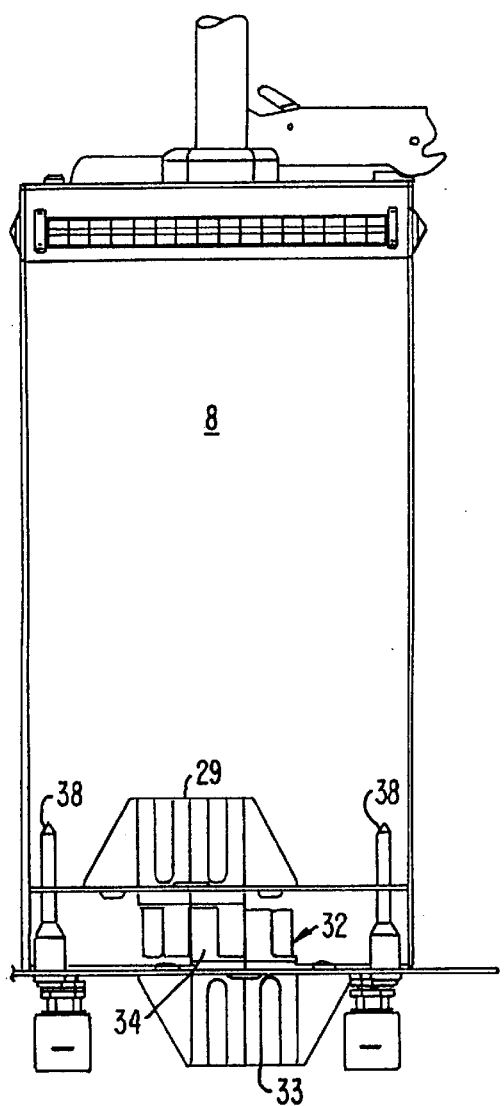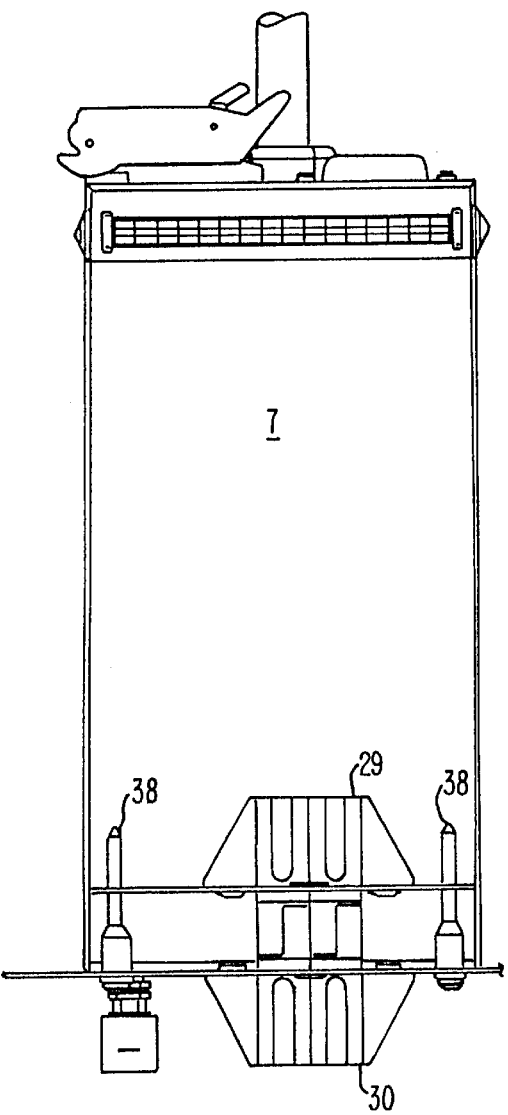
FIG. 3A.  FIG. 3B.
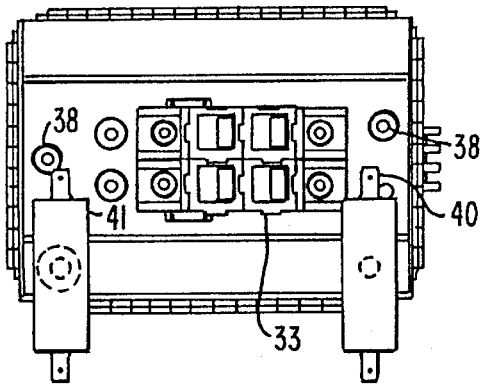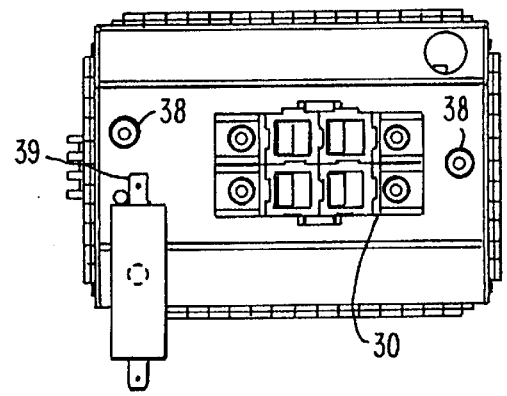
FIG. 3C.  FIG. 3D.

FLEXIBLE IMPLEMENTATION OF DISTRIBUTED DC POWER

FIELD OF THE INVENTION

The present invention relates generally to DC power distribution systems and more specifically to fault tolerant DC power distribution systems for computer and other electronic systems.

BACKGROUND OF THE INVENTION

A common technique for the distribution of DC power to large, multi-component computer systems or electronics systems is to provide a common power rail. (The term "rail," as used herein, includes both the hot path and return path.) This rail can be energized with DC power with a minimum number of connections to a power source yet can supply power to as few or as many components or units as the system requires. The impact of any interruption of the power to the rail during operation, however, can be substantial.

Various systems have been developed to render the power supplied through a common rail more reliable or fault tolerant. The power distribution system can include batteries. In the event of an interruption in the supply from the power source, the batteries can energize the rail for a sufficient period of time to permit an orderly shutdown or even to maintain reduced operation for a limited period of time. Redundant rails may be provided, each of which is separately powered, either from a separate power source or from batteries. In the event of an interruption of the power supply on one rail, power can be drawn from the other rail. Finally, even in a single rail system, that rail may be provided with power from more than one source. Thus, that rail will remain energized even should one of the power sources fail.

Two fault tolerant power distribution systems for computer systems are particularly relevant here. These systems both employ two rails, with power provided by 1,500 watt, 58 volt DC bulk power supplies. The computer system requires approximately 3,000 watts of DC power, at between 52 and 58 volts. Hence, two bulk power supplies are used in parallel.

In the first system, referred to as "N+1," the first rail is powered by two bulk power supplies to provide the 3,000 watt system requirements, plus a third bulk power supply to provide fault tolerance. All three bulk power supplies, in turn, draw power from an AC power distribution unit ("PDU") connected to a conventional AC power source. The second rail is powered by three batteries. As with the bulk power supplies, two batteries would be sufficient to meet the power requirements of the system. The third battery merely provides additional fault tolerance.

In the event any one of the three bulk power supplies fails or is taken out of service, the remaining bulk power supplies can meet system requirements. Should two or more bulk power supplies be unavailable, or AC power to the bulk power supplies is interrupted, system components can draw power from the second, battery-powered rail without any interruption in operation.

In the second power distribution system, a pair of the same bulk power supplies provide 3,000 watts of power to the first rail. A second pair of bulk power supplies provides power to the second rail. Each pair of bulk power supplies draws power from a separate PDU. In addition, each rail is also associated with a pair of batteries. This power distribution system is sometimes referred to as a "2N" system.

The 2N power distribution system provides even greater fault tolerance than the N+1 system. Either PDU can fail or be taken out of service. Even if AC power is interrupted completely, both rails remain energized by their separate batteries. In addition, the redundant pairs of bulk power supplies provides great flexibility and fault tolerance.

It sometimes occurs, however, that customer demand or changing conditions dictate that an N+1 system should be upgraded to a 2N system or that the protections of a 2N system are no longer required. The current invention permits such conversion between power distribution systems of varying degrees of fault tolerance and operational availability quickly, easily, and cost-effectively.

SUMMARY OF THE INVENTION

This invention is a variably configurable system for providing DC power to independent, redundant power rails suitable for use by, for example, a computer system or electronics equipment. In one configuration, providing maximum DC power availability, the system includes multiple PDUs, each with its own AC power input, that feed AC power to associated banks of DC power supply units. These power supply units apply DC power to the power rails. An alternative configuration provides a fault tolerant, less costly DC power system in which multiple DC power supply units arranged in parallel receive AC power from a single PDU. The rails also receive DC power from a bank of batteries.

Conversion of the system from a multiple PDU configuration (maximum DC power availability) to a single PDU configuration (fault-tolerant) is accomplished with a converter unit installed in place of a PDU, and by simple reversal of a bus bar connection. Physical keying, sensor switches, and simple operation ensure that the system is correctly configured.

In this manner, the present invention provides a fault-tolerant power distribution system than can be easily configured to varying levels of operational availability or power source redundancy using the same basic system. The invention thereby provides a cost effective way of offering varying degrees of power supply redundancy. Moreover, the system of the invention can be reconfigured at the place of manufacture or after installation with a minimum of cost and difficulty. The simplicity of the reconfiguration and various other safeguards reduces the risk that either factory personnel or the end user will misconfigure the system and thereby cause an inadvertent shutdown of the associated computer system or electronics equipment. Further, the system can be reconfigured without interruption of power supply to the rails, permitting reconfiguration while the associated computer system or electronics equipment is operating.

BRIEF DESCRIPTION OF THE DRAWINGS

FIG. 3 is a top and rear view of the PDUs of the preferred embodiment in the 2N configuration.

DESCRIPTION OF THE PREFERRED EMBODIMENT

In its preferred embodiment, the system may provide either for two power supplies mirrored against two other power supplies (the "2N configuration") or for two power supplies with lesser levels of redundancy (the "N+1 configuration").

Figure 1:
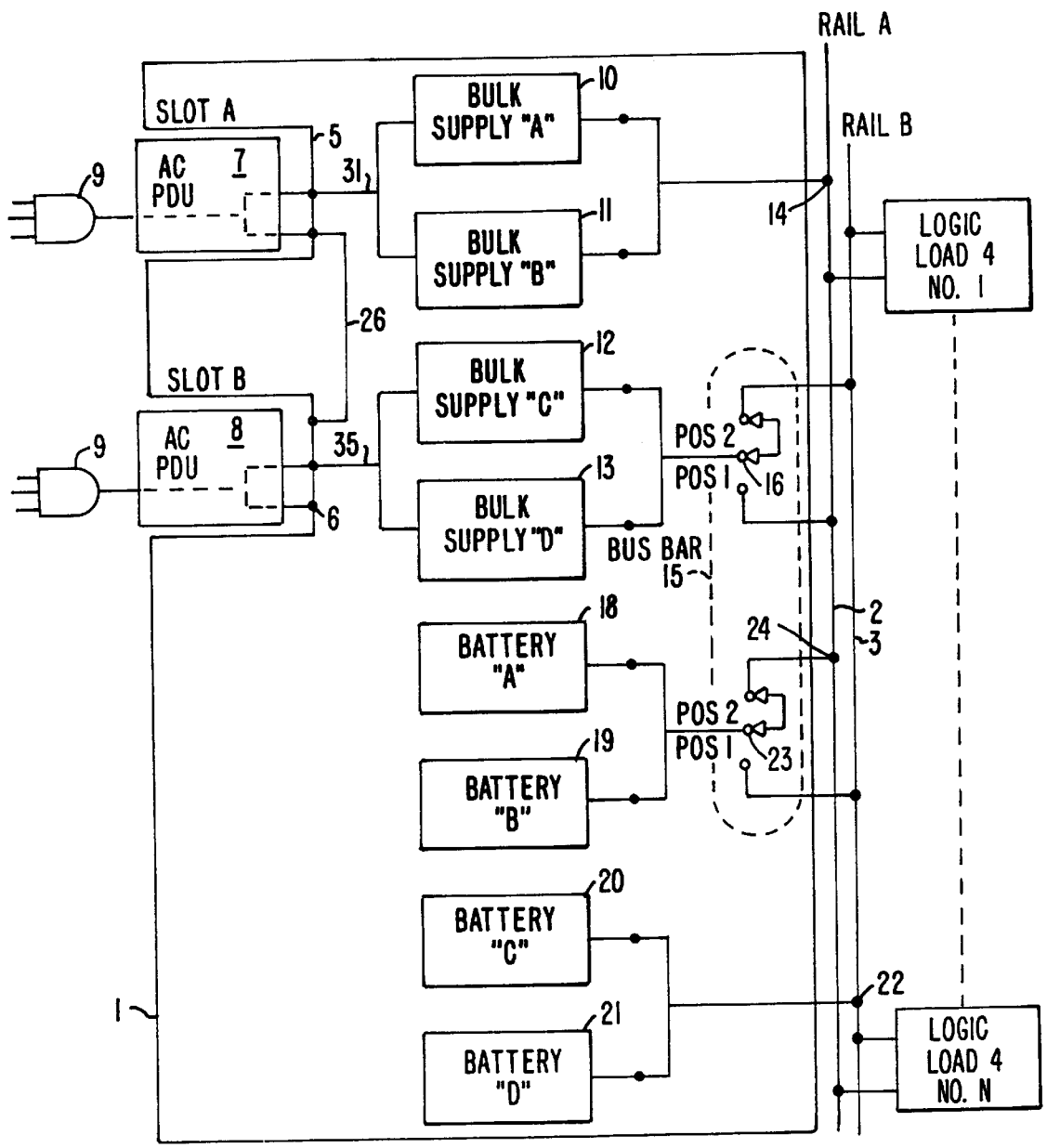
FIG. 1 shows the preferred embodiment of the invention, configured for two AC power sources and two pairs of batteries (the "2N Configuration").

FIG. 1 illustrates the 2N configuration of the preferred embodiment. As seen in FIG. 1, the preferred embodiment of the invention includes a power cage 1 constructed to provide DC power to two independent power rails, rail A 2 and rail B 3, that, in turn, provide the power to the customer replaceable units ("CRUs") of, for example, a computer system represented by the logic loads 1-N 4. (For clarity, the return path connections are not shown.) The power cage has two slots, slot A 5 and slot B 6.

For the 2N configuration, a single PDU 7, 8 is installed into each of slot A and slot B. The PDU design may include techniques for EMI filtering and transient energy suppression as well as AC breaker protection. Each PDU is connected to a source of AC power by a conventional power cord and plug 9 and provides power to two 1500 watt DC bulk power supplies, arranged in parallel. The PDU in slot A feeds "Bulk Supply A" 10 and "Bulk Supply B" 11; the PDU in slot B feeds "Bulk Supply C" 12 and "Bulk Supply D" 13. Bulk power supplies A and B are then connected at point 14 to rail A. Bulk power supplies C and D are connected to bus bar switch 15 (shown in phantom) at point 16. In the 2N configuration, the bus bar switch is set to position 2 (shown in phantom) which thereby connects bulk power supplies C and D to rail B at point 17.

Also providing power to the power rails are two pairs of battery units, each of which is capable of providing up to 1500 watts of power at approximately 52 volts DC. Batteries B 20 and D 21 are coupled in parallel to rail B at point 22. Batteries A 18 and C 19 are connected in parallel to the bus bar switch at point 23. With the bus bar switch set to position 2, batteries A and C connect to rail A at point 24.

Thus, in the 2N configuration, rail A has up to 3,000 watts of power available from bulk power supplies A and B or, alternatively, from batteries A and C. Rail B is similarly powered by bulk power supplies C and D or, alternatively, batteries B and D.

Figure 2:
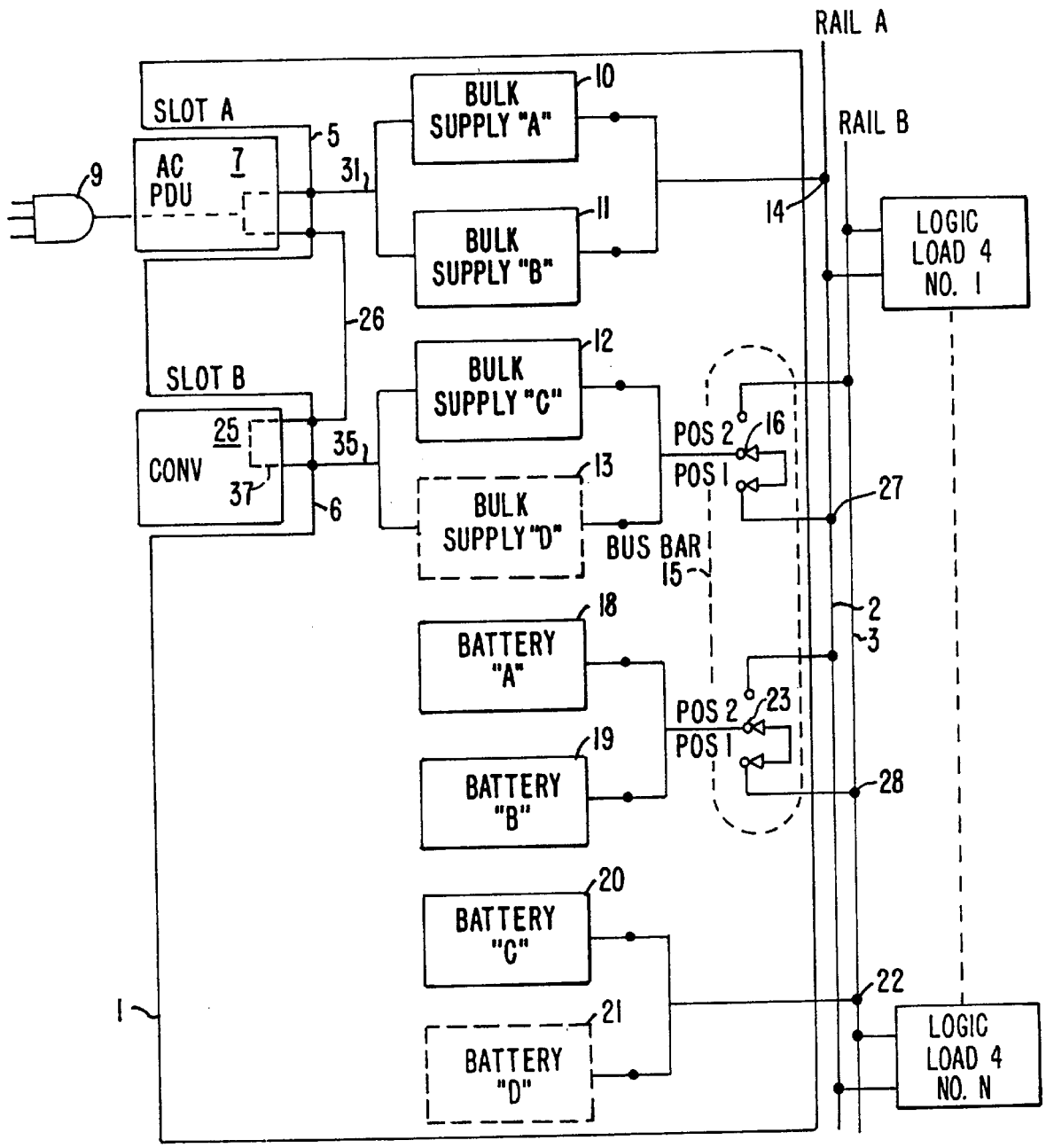
FIG. 2 shows the preferred embodiment of the invention, configured for only one AC power source and a bank of up to four batteries (the "N+1 Configuration").
Figure 4A:
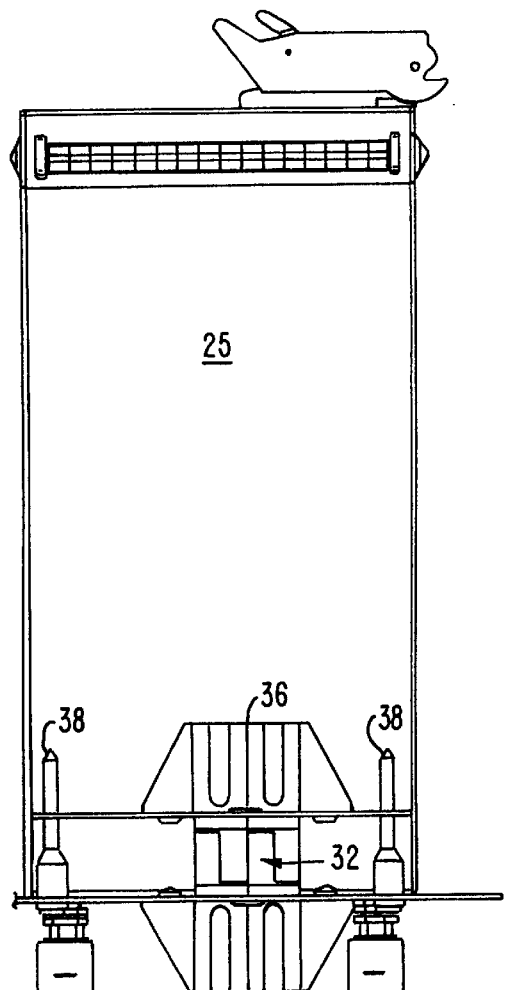
FIG. 4 is a top and rear view of the PDU and converter unit of the preferred embodiment in the N+1 configuration.
Figure 4B:
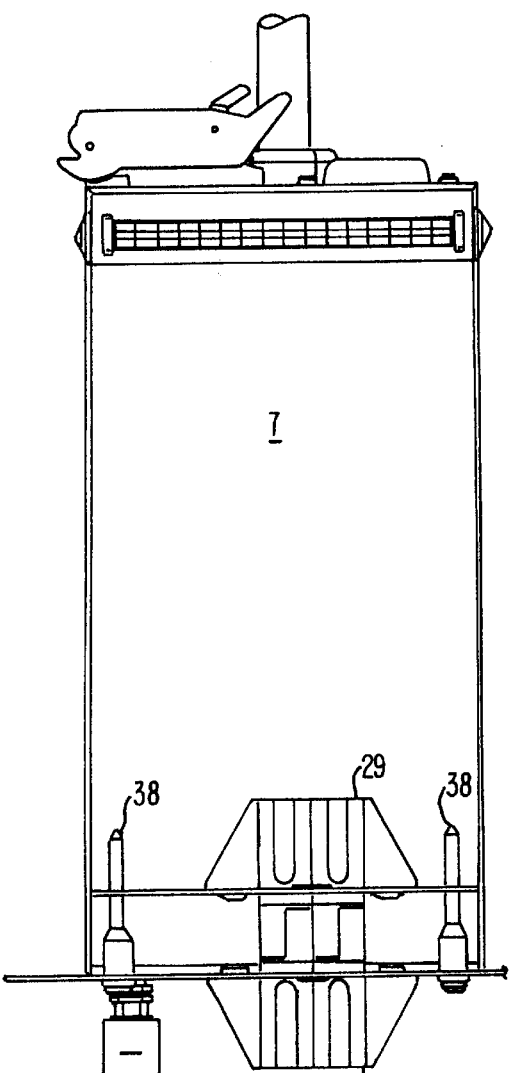
Figure 4C:
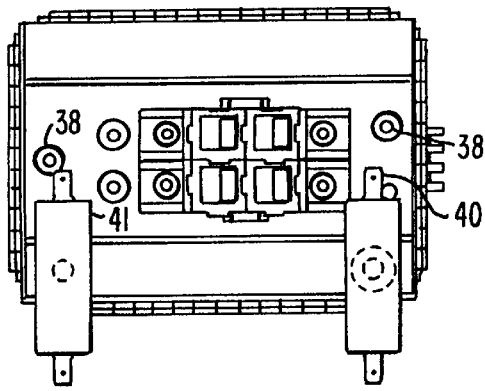
Figure 4D:
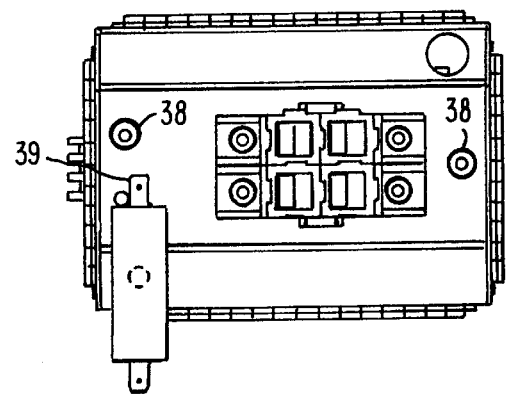

FIG. 2 shows the same system, set in the N+1 configuration. In this configuration, a converter unit 25 has been installed in slot B in place of a PDU. The converter unit does not provide any power itself. Rather, it connects jumper 26 with bulk power supplies C and D (if present), to provide power to these bulk power supplies from the PDU in slot A.

FIG. 2 shows the bus bar set to position 1 at both points 16 and 23. This causes the bulk power supplies C and D to be connected to rail A at point 27 and batteries A and C to be connected to rail B at point 28.

FIG. 2 shows four bulk power supplies and four batteries. Only three of each are required, however. Bulk power supply D and battery D are optional, as indicated by their being shown in phantom.

The 2N configuration offers many levels of power supply redundancy. CRUs may draw power equally from either rail A or rail B. Each rail is energized by a separate pair of bulk power supplies. The bulk power supplies themselves have independent power sources. In the event that AC power to both PDUs is terminated, both rails will remain independently powered by the two pairs of batteries.

In the N+1 configuration, power supply redundancy is somewhat reduced but still significant. CRUs may still draw power from either rail A or rail B. Rail A is powered by at least three bulk power supplies, thereby permitting one bulk power supply to be disabled without affecting the power supply to the rail. Rail B is powered by at least three battery units, thereby permitting one battery unit to be disabled without interrupting power supply to that rail.

The PDUs may be Tandem part No. 112309 or similar units. The DC bulk power supply units may be Tandem part No. 112314 or similar units. The battery units may be Tandem part No. 112316 or similar units.

FIG. 3 shows PDUs installed in slots A and B in the 2N configuration. Each PDU has a four pole connector arranged in a 2×2 array 29. When the PDU is connected to an AC power source, the four poles provide two separate power outlets.

Slots A and B have connector parts matching those of the PDUs. The connector part in slot A 30 is positioned so that it mates with and receives AC power from both pairs of poles of the PDU connector. Power from one pair of poles on the PDU is thereby conveyed by line 31, shown in FIG. 1, to bulk power supplies A and B. Power from the other pair of poles on the PDU is conveyed through the remaining pair of poles in the connector of slot A to jumper 26 on FIG. 1, and thus to a first pair of poles 32 within the connector in slot B.

The position of the connector 33 in slot B is offset so that only the second pair of poles 34 mates with the connector of the PDU. Power from the PDU flows through this connection to bulk power supplies C and D on line 35, shown in FIG. 1. The first pair of poles 32 of the slot B connector is not engaged. Therefore, there is no connection with the PDU in slot A. Similarly, a pair of poles from the connector on the PDU in slot B is unused.

FIG. 4 shows a PDU installed in slot A of the power cage and a converter installed in slot B, in the N+1 configuration. The arrangement with respect to the PDU in slot A is identical to that shown in FIG. 3 for the 2N configuration. The converter in slot B, however, alters the operation of the system. The converter has the same four pole connector 36 as a PDU, positioned, however, so that when the converter is properly installed in slot B, both pairs of poles mate with the contacts of the connector in that slot. Unlike a PDU, the converter has no power cord. Rather, it houses a two pole in/out jumper 37 (shown in phantom in FIG. 2). The in pole of the jumper is connected to the first pair of poles in the connector. The out pole is connected to the second pair of contacts in the connector. Thus, when a converter is installed in slot B, power flows over jumper 26, through the first pair of contacts in the slot B connector 32 to the in pole of the in/out jumper, to the out pole of that jumper, and through the second pair of poles in the converter connector to bulk power supplies C and D on line 35, as shown in FIG. 2.

The preferred embodiment includes several design features to reduce or eliminate human error. Mechanical keying, 38 in FIGS. 3 and 4, prevents the installation of a converter unit in slot A and ensures correct placement of PDUs and the converter units in the slots. Three sense switches determine what type of device is installed in each PDU slot. Slot A has a single switch 39 to determine the presence of a PDU. Slot B has two sense switches: one switch 40 determines the presence of either a PDU or a converter while the second switch 41 identifies which type of unit it is. The state of these three sense switches can be read by a diagnostic subsystem in the associated computer system or simply communicated to the user by lights or appropriate messages.

Figure 5:
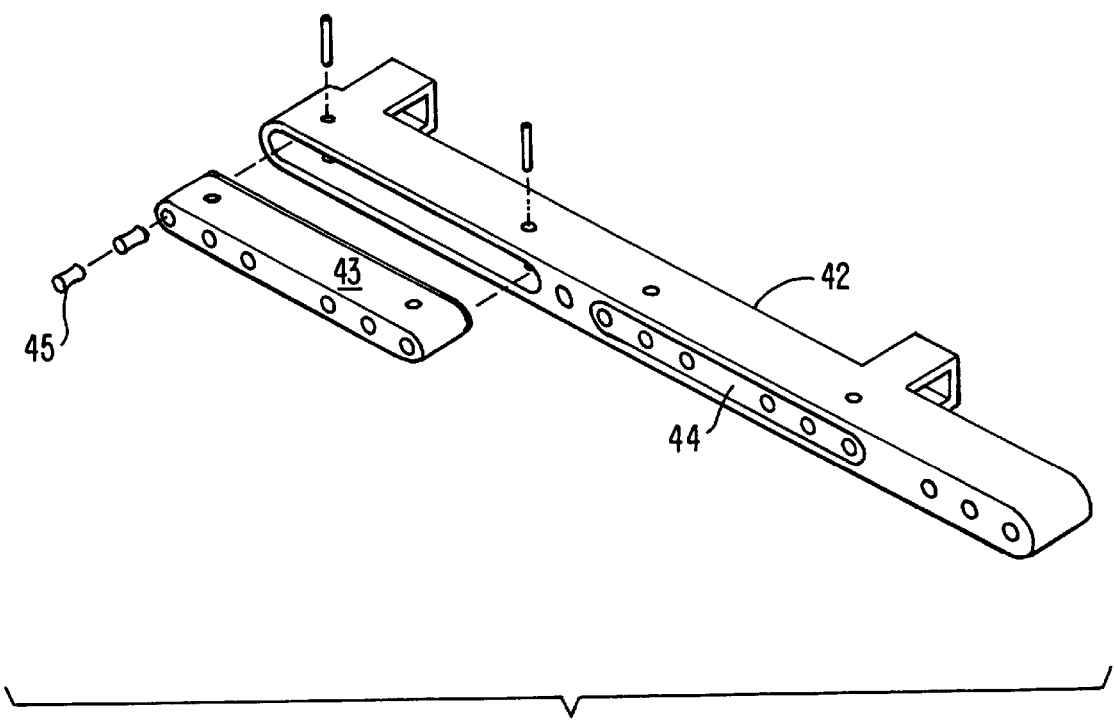
FIG. 5 is a perspective view of the bus bar switch of the preferred embodiment.

FIG. 5 shows the bus bar switch 15 in greater detail. The housing of the bar, 42, is a non-conducting, rigid material such as polycarbonate. Embedded within the housing are two copper buses 43, 44. These buses contain contact recesses 45 appropriately placed to receive connection pins at points 16 and 17 of FIG. 1. The bus bar is eccentrically designed such that it completes the connections shown as position 1 of FIG. 1 in one orientation and when rotated 180° completes the connections of position 2.

Efforts have also been taken to ensure that bus bar switch is properly set. The bus bar is constructed to have only two positions, 180 degrees apart. In either position, the bus bar switch covers the unused contact pins to protect against inadvertent shorting of the power system. Text in opposite orientations on the bus bar switch indicates either "1 PDU" or "2 PDU". The text facing up identifies the system configuration to which the bus bar switch is set. In addition, the diagnostics subsystem can determine the configuration from the voltage at the battery contact point. In the 2N configuration, when bulk power supplies A and B are disabled, the voltage measured at point 16 will decrease.

The system as just described may be easily and inexpensively configured for either 2N or N+1 operation, either at the factory or in the field, simply by installing the desired PDU or converter in slot B and closing the bus bar switch to the correct position. Mechanical keying, sense switches with associated indicator lights and messages, clear labeling of the bus bar switch, and simple diagnostic subsystem routines protect against misconfiguring the system. Alternatives and substitution to and within this system, however, will be apparent to persons of ordinary skill in the art. For example, the connectors between the PDU or converter unit and the power cage slots need not be single four contact units but rather, two or more pairs of contacts; correct installation of PDU's and converter units could be ensured other than by mechanical keying; and the system could encompass more than simply two AC power supplies. Accordingly, it is not intended to limit the invention except as provided in the claims.

We claim:

1. A DC power distribution system comprising:
    a pair of power distribution rails;
    a plurality of battery power units;
    a plurality of DC power supply units;
    at least one AC power distribution unit for connection to a source of AC power;
    a first AC power connection port to receive a first of said AC power distribution units and to connect said first AC power distribution unit to a first of said DC power supply units and to a first jumper;
    a second AC power connection port for receiving either a) a second AC power distribution unit or, b) a converter unit, said second AC power connection port configured to connect said second AC power distribution unit to a second of said DC power supply units or to connect said first jumper and to said second DC power supply unit through said converter unit;
    at least one of said DC power supply units being connected to a first of said pair of power distribution rails and the remainder of said DC power supply units being selectively connected the pair of power distribution rails to achieve a first power distribution configuration when said second AC power distribution unit is received by the second AC power connection port or a second distribution configuration when the converter unit is received by the second AC power connection port; and
    at least one of the battery units being connected to a one of said pair of power distribution rails and the remainder of said battery units being connected to the one or another of the pair of power distribution rails.

2. Apparatus selectively configurable to form one of two distribution systems to supply direct current (DC) power, comprising:
    at least first and second power distribution rails;
    a first number of DC power supply units connected to supply DC power to the first power distribution rail;
    a second number of DC power supply units;
    at least a first AC power distribution unit for connection to a source of AC power and coupled to supply AC power to the first number of the DC power supply units and to a first jumper;
    an AC power connection port for receiving either (a) a second AC power distribution unit or (b) a converter unit, the AC power connection port configured to connect the second AC power distribution unit to the second number M of DC power supply units or to connect the converter unit to the first jumper and to the second DC power supply unit, the converter unit operating to electrically couple the first jumper to the second number of DC power supply units;
    a switch selectively settable to a first switch position to connect the second number of DC power supply units to the second power distribution rail when the second AC power distribution unit is received by the second AC power connection port, and to a second switch position to connect the second number of DC power supply units to the first power distribution rail when the converter unit is received by the AC power connection port.

3. The apparatus of claim 2, wherein the second number of DC power supply units is at least equal to the first number of DC sower supply units.

4. The apparatus of claim 2, wherein the second number of DC power supply units equals the first number of DC power supply units when the second AC power distribution unit is received by the AC power connection port.

5. The apparatus of claim 2, wherein the second number of DC power supply units equals the first number of DC power supply units when the second AC power distribution unit is received by the AC power connection port, and the second number of DC power supply units is at least 1 when the converter unit is received by the AC power connection port.

6. The apparatus of claim 2, including:
    a first number of battery elements connected to the second power distribution rail, and
    a second number of battery elements connected (i) to the first power distribution rail when the switch is set to the first switch position and (ii) to the second power distribution rail when the switch is set to the second switch position.

7. The apparatus of claim 6, wherein the first number of battery elements is equal to the second number of battery elements.

8. The apparatus of claim 6, wherein the first number of battery elements is equal to the second number of battery elements when the switch is in the first position, and the second number of battery elements is at least 1 when the switch is set to the second switch position.

9. The apparatus of claim 2, wherein the switch includes a bus bar located in a first position to establish the first switch position, or a second position to establish the second switch position.

10. A configurable power distribution system for supplying direct current (DC) power to a pair of power distribution rails, comprising:

a first number of DC power supply units connected to supply DC power to a one of the pair of power distribution rails;

a second number of DC power supply units;

a two position bus element positionable in a first connection position to connect the second number of DC power supply units to the other of the pair of power distribution rails, and in a second connection position to connect the second number of DC supply units to the one of the pair of power distribution rails;

a connection to a source of AC power to supply AC power to the first and second number of DC power supply units; and a first number of battery means connected to the first power distribution rail, a second number of battery means connected to the first power distribution rail when the two position bus element is positioned in the first connection position and to the second power distribution rail when the two position bus element is positioned in the second connection position.

11. The configurable power distribution system of claim 10, wherein the second number of DC power supply units is at least equal to the first number of DC power supply units.

12. The configurable power distribution system of claim 10, wherein the second number of DC power supply units is at least equal to the first number of DC power supply units when the two position bus element is positioned in the first connection position, and wherein the second number of DC power supply units is at least 1 when the two position bus element is positioned in the second connection position.

13. The configurable power distribution system of claim 10, wherein the two position bus element includes a bus bar configured to be attached to a bus connector in one or another of two connections.

* * * * *